United States Patent [19]

Roza et al.

[11] Patent Number: 4,639,911

[45] Date of Patent: Jan. 27, 1987

[54] HEAD-END AND RECEIVER FOR A SIGNAL DISTRIBUTION SYSTEM

[75] Inventors: Engel Roza; Hendrik G. Van Veenendaal, both of Eindhoven, Netherlands

[73] Assignee: U. S. Philips Corporation, New York, N.Y.

[21] Appl. No.: 531,544

[22] Filed: Sep. 12, 1983

[30] Foreign Application Priority Data

Sep. 17, 1982 [NL] Netherlands ............... 8203599

[51] Int. Cl.[4] ............... H04J 1/00; H04N 7/04; H04K 1/10
[52] U.S. Cl. ............... 370/69.1; 358/143; 375/38
[58] Field of Search ............... 370/69.1, 76; 455/45, 455/102; 375/27, 38; 358/142, 143, 144, 13, 197, 198

[56] References Cited

U.S. PATENT DOCUMENTS

| | | | |
|---|---|---|---|
| 3,939,303 | 2/1976 | Wise | 455/108 |
| 4,218,697 | 8/1980 | Leventer | 358/13 |
| 4,227,204 | 10/1980 | Rossi | 358/13 |
| 4,232,293 | 11/1980 | Harris | 370/27 |
| 4,449,218 | 5/1984 | Strehl | 370/69.1 |
| 4,470,070 | 9/1984 | Griffis | 358/197 |
| 4,496,979 | 1/1985 | Yu et al. | 358/198 |

*Primary Examiner*—Douglas W. Olms
*Assistant Examiner*—Frank M. Scutch, III
*Attorney, Agent, or Firm*—Thomas A. Briody; William J. Streeter; Leroy Eason

[57] ABSTRACT

Head-end and receiver for a signal distribution system for signals having a wide frequency band and for accompanying signals having a narrow frequency band, such as the video signal and the sound signal of a television signal, respectively, digital signals being used for the distribution. The head-end comprises a first (4) and a second (5) A/D-converter for the signal having the wide frequency band and the signal having the narrow frequency band, respectively. The receiver comprises corresponding D/A-converters (13, 14). In order to avoid a specific frame structure and corresponding frame synchronization, the digital output signal of the second A/D-converter is modulated in a modulator (7) in the head-end on a subcarrier from a source (6) and thereafter added to the signal having the wide frequency band, and the combined signal is applied to the first A/D-converter (4) which is provided by a one-bit modulator. In the receiver the received digital signal is applied to a demodulator (17) via a bandpass filter (15), the demodulator output signal being applied to the second.

8 Claims, 4 Drawing Figures

HEAD-END AND RECEIVER FOR A SIGNAL DISTRIBUTION SYSTEM

BACKGROUND OF THE INVENTION

The invention relates to a head-end for a signal distribution system for signals having a wide frequency band and for accompanying signals having a comparatively narrow frequency band, such as the video signal and the sound signal of a television signal, respectively, use being made of digital signals for the signal distribution, comprising a first analog-to-digital converter for the signals having the wide frequency band and a second analog-to-digital converter for the signals having the narrow frequency band.

The invention also relates to a receiver suitable for processing the digital signals generated by the head-end of the signal distribution system, comprising a first digital-to-analog converter for the signals having the wide frequency band and a second digital-to-analog converter for the signals having the narrow frequency band.

Such a head-end and such a receiver for a signal distribution system are inter alia employed in combination with light transmission through optical fibres. The signal-to-noise ratio of an optical transmission path is of such a nature that in practice digital modulation methods having a low number of levels are usually preferred. Simultaneous transmission of, for example, the sound signal and the video signal of a television signal is then possible by multiplexing the sound and the video signals after digitizing. This requires in the head-end a given frame structure together with methods for frame synchronization in the receiver.

SUMMARY OF THE INVENTION

The invention has for its object to provide a head-end for a signal distribution system of the above type which does not require a multiplex structure and can be realized in a simple way. The invention also has for its object to provide a receiver in which the two signals can be separated in a simple way.

According to the invention, the head-end for a signal distribution system of the above type is characterized in that the digital output signal of the second analog-to-digital converter is applied to means for modulating the digital output signal on a sub-carrier, that the modulated sub-carrier is added to the signal having the wide frequency band and that the combined signal is applied to the first analog-to-digital converter, which is formed by a one-bit modulator, for conversion into a digital signal which is thereafter used for the signal distribution.

Also according to the invention, the receiver is characterized in that the digital signal received from the head end is applied via a bandpass filter to means for demodulating the modulated subcarrier signal and for regenerating a digital signal which is a copy of the digital output signal of the second analog-to-digital converter of the head-end and for applying the regenerated digital signal to the second digital-to-analog converter.

It should be noted that by adding an additional signal (in the present case the modulated sound signal) to the video signal the quality of the one-bit coding is improved. The structure of the quantizing noise becomes finer and the clock extraction is simplified as long sequences of ones and zeroes are interrupted by the additional signal.

DESCRIPTION OF THE DRAWINGS

The invention will now be further described by way of example with reference to the accompanying drawings in which.

DESCRIPTION OF THE PREFERRED EMBODIMENT

Figure 1:
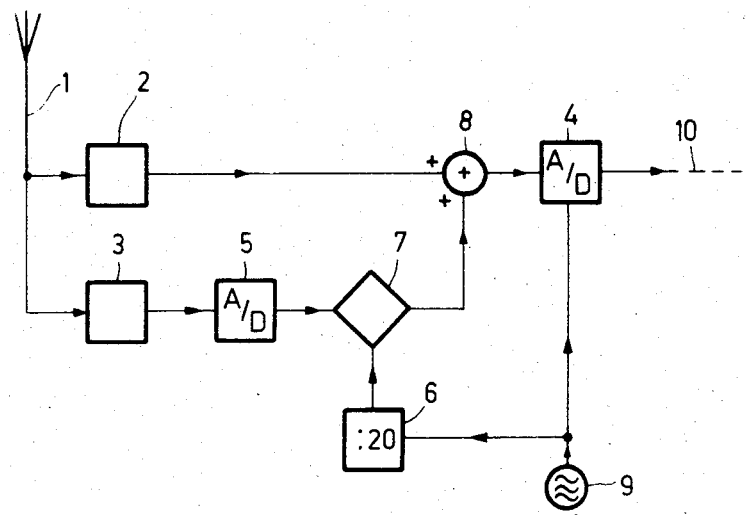
FIG. 1 shows a block circuit diagram of an embodiment of a head-end for a signal distribution system in accordance with the invention.

The head-end for a signal distribution system as shown in FIG. 1, which is for example used to distribute television signals, comprises a demodulator 2 for a video signal and a demodulator 3 for a sound signal, connected to a receive aerial 1. The video signal is the above-mentioned wide frequency band signal and the sound signal is the above-mentioned accompanying signal having a (comparatively) narrow frequency band.

The head-end comprises a first analog-to-digital converter 4 (A/D-converter 4) for the video signal and a second analog-to-digital converter 5 (A/D-converter 5) for the sound signal.

The digital output signal from the second A/D-converter 5 is applied to an amplitude modulator 7 with suppressed carrier, which is connected to a sub-carrier source 6. The amplitude-modulated subcarrier from the modulator 7 is added to the video signal in a summing means 8 and the combined signal is applied to the first A/D-converter 4 which is formed by a one-bit modulator.

The frequency of the subcarrier of source 6 is chosen to be above the frequency band of the video signal and is in this example 7 MHz. The strength of the modulated subcarrier at the input of A/D-converter 4 is chosen in this example to be −20 dB below the maximum drive range of this A/D-converter, to realize a bit error rate (BER) of $10^{-7}$.

A suitable embodiment of A/D-converter 4, in the form of a 140 Mb/s delta-sigma modulator, is described in article 14.4 of the Proceedings of the 7th European Conference on Optical Communication, 8–11 September 1981, Copenhagen. A clock pulse source 9, which controls the A/D-converter 4, has a clock pulse repetition rate of 140 Mhz. The subcarrier for modulator 7 can be derived therefrom by means of a divide-by-20 divider, as shown in FIG. 1, which forms the source 6.

The bit rate of the digital sound channel is, for example 2 Mb/s, which enables the use, at low cost, of delta-sigma modulation for mono-sound or pulse code modulation (PCM) for stereo sound.

Figure 2:
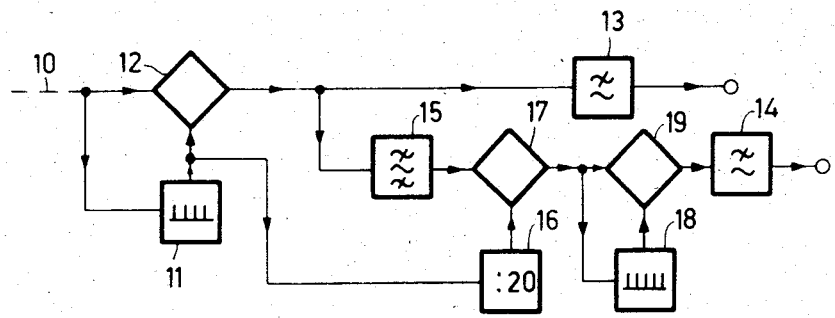
FIG. 2 shows a block circuit diagram of an embodiment of a receiver in accordance with the invention.

Thereafter the output signal from A/D-converter 4 is applied to the receiver shown in FIG. 2 via transmission path 10, which may comprise an optical path with light transmission through an optical fibre.

This receiver comprises a clock extraction circuit 11 having a clock pulse repetition rate of 140 MHz, which controls a regenerator 12. The signal at the output of the regenerator 12 is a copy of the digital output signal of the one-bit A/D-converter 4 of the head-end shown in FIG. 1.

In addition, the receiver comprises a first digital-to-analog converter 13 (D/A-converter) for the video signal, which in the case of delta-sigma modulation is a low-pass filter.

In addition, the receiver comprises a second D/A-converter 14 for the sound signal. In the event of delta-sigma modulation, this is also a low-pass filter.

A bandpass filter 15, having the subcarrier frequency, (7 MHz) as the central frequency applies the digital output signal of regenerator 12 to an amplitude demodulator 17 connected to a local subcarrier source 16. The subcarrier source 16 is in the form of a divide-by-20 divider which derives, by dividing by 20, the local 7 MHz subcarrier from the 140 MHz clock pulse repetition rate of the clock extraction circuit 11.

The demodulated subcarrier signal is applied to a clock extraction circuit 18 having a clock pulse repetition rate of 2 MHz, and to a regenerator 19 connected thereto. The digital output signal of this regenerator 19 is a copy of a digital output signal of the A/D-converter 5 of the head-end shown in FIG. 1. The output signal of regenerator 19 is applied to the D/A-converter 14 for reproducing the sound signal.

It must be acknowledged that in the head-end for the signal distribution system of FIG. 1, no frame structure is employed and the head-end is of a simple structure. Also in the receiver, the video signal and the sound signal can be separated in a simple way without the use of frame synchronization.

Figure 3:
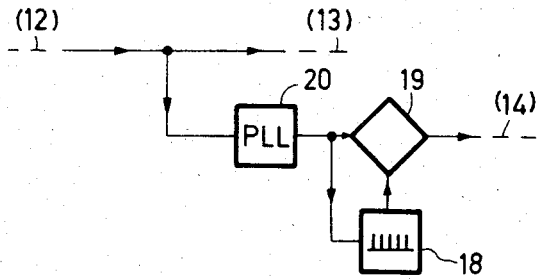
FIG. 3 shows a block circuit diagram of an alternative embodiment of a portion of the receiver of FIG. 2.

As an alternative to the amplitude modulation by means of modulator 7, use can be made of FSK-modulation for modulating the subcarrier. In the receiver (FIG. 2) the bandpass filter 15 and demodulator 17 may then be replaced by a phase-locked loop circuit (PLL) 20 in the manner shown in FIG. 3.

Figure 4:
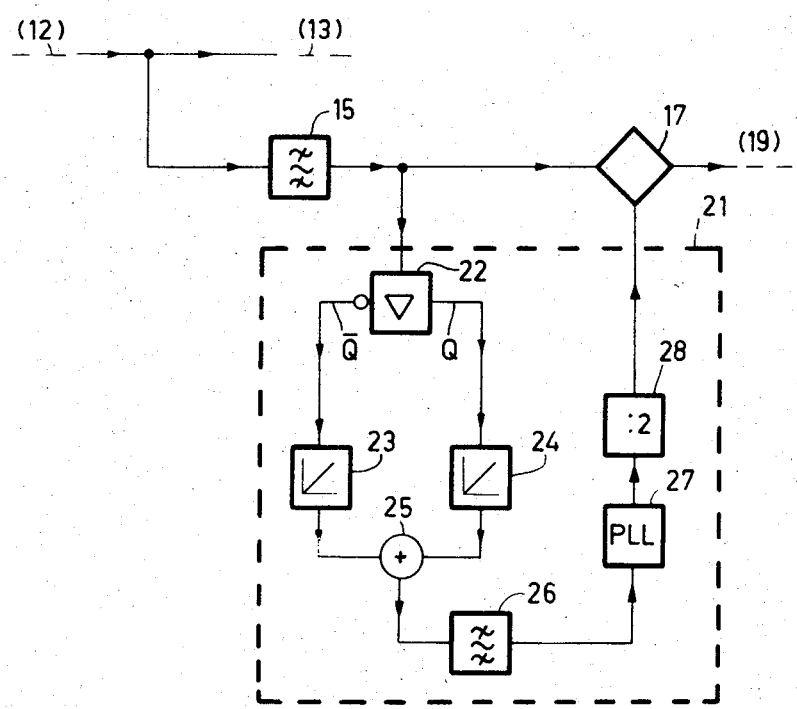
FIG. 4 shows a block circuit diagram of an alternative embodiment of another portion of the receiver of FIG. 2.

An alternative to the local subcarrier source 16 of FIG. 2 is shown in FIG. 4 within the block 21. This alternative is a so-called "squaring loop" comprising a buffer 22 having two outputs Q and $\overline{Q}$ whose phases are shifted through 180° and which is connected to the output of filter 15. The buffer output signals are added together in a summing means 25 after rectification by two rectifiers 23 and 24. The output signal of the summing means 25 comprises 14 MHz-components which are selected by a bandpass filter 26 and applied to a phase-locked loop (PLL) 27 which has a free-running frequency of 14 MHz. The local subcarrier to be applied to the demodulator 17 is derived from the output signal of the PLL 27 by a divide-by-2 divider 28.

What is claimed is:

1. In a receiver for processing received digital signals signifying a signal having a wide frequency band and a sub-carrier added to said signal having said wide frequency band, said sub-carrier being modulated with a signal having a narrow frequency band, comprising first digital-to-analog converter means for generating said signal having said wide frequency band in response to said received signal;
bandpass filter means for extracting said modulated sub-carrier from said received signal;
amplitude demodulator means connected to said bandpass filter means for generating a demodulated digital signal corresponding to said signal having said narrow frequency band; and
second digital/analog converter means connected to said amplitude demodulator means for converting said demodulated digital signal to said signal having said narrow frequency band.

2. A receiver as claimed in claim 1, further comprising signal regenerating means for regenerating said received signal under control of clock signals extracted therefrom, before application of said received signal to said first digital/analog converter means and said bandpass filter means.

3. A receiver as claimed in claim 2, wherein said amplitude demodulator means has an output;
further comprising signal regenerator means connected to said output of said amplitude demodulator means for extracting timing signals from said demodulated digital signal and regenerating said narrow frequency band signals under control of the so-extracted timing signals.

4. In a distribution system receiving wide frequency band signals and accompanying signals having a comparatively narrow frequency band and distributing digital distribution signals signifying said wide band and accompanying signals, a head-end comprising:
first analog-to-digital converter means;
means for demodulating said accompanying signals;
second analog-to-digital converter means for converting said demodulated accompanying signals to second digital signals;
means for furnishing a subcarrier;
means for modulating said second digital signals onto said subcarrier thereby creating a digitally modulated subcarrier;
means for adding said digitally modulated subcarrier to said wide frequency band signals thereby creating a combined signal; and
means for applying said combined signal to said first analog-to-digital converter means for conversion into said digital distribution signals.

5. A distribution system as set forth in claim 4, wherein said signal having said narrow frequency band is an audio signal and said signal having said wide frequency band is a video signal.

6. A distribution system as set forth in claim 4, wherein said first analog-to-digital converter means is a delta-sigma modulator.

7. A receiver as set forth in claim 1, wherein said first digital-to-analog converter means is a low-pass filter.

8. A distribution system as set forth in claim 4, wherein said first digital-to-analog converter means comprises a one-bit modulator.

* * * * *